A. P. TUTTON.
Car Brake.
No. 23,727.
Patented Apr. 19, 1859.
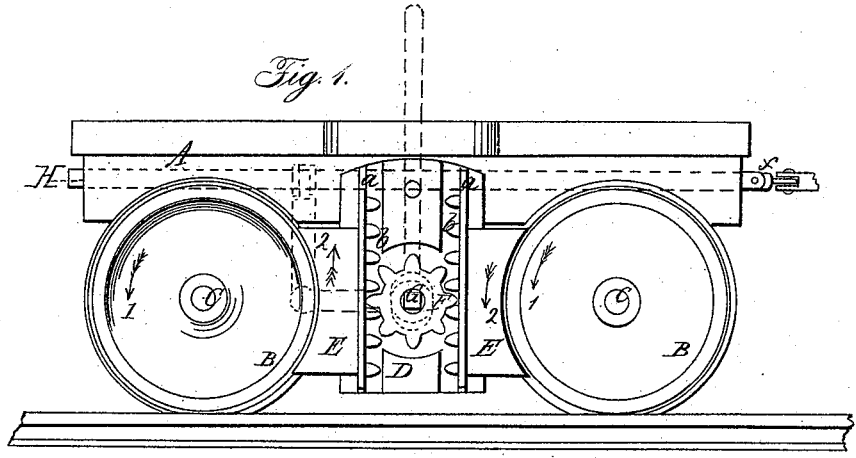
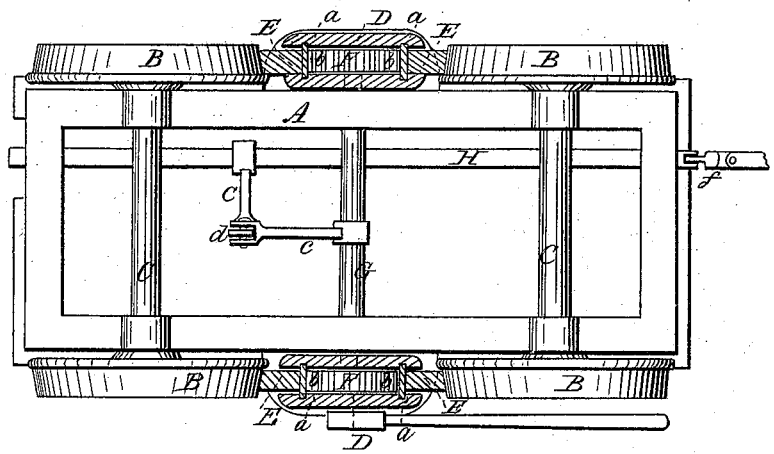
Witnesses:
Inventor:

UNITED STATES PATENT OFFICE.

A. P. TUTTON, OF READING, PENNSYLVANIA.

RAILROAD-CAR BRAKE.

Specification of Letters Patent No. 23,727, dated April 19, 1859.

*To all whom it may concern:*

Be it known that I, A. P. TUTTON, of Reading, in the county of Berks and State of Pennsylvania, have invented a new and Improved Car-Brake; and I do hereby declare that the following is a full, clear, and exact description of the same, reference being had to the annexed drawings, making a part of this specification, in which—

Figure 1, is a side view of a car truck with my invention applied to it. Fig. 2, is a plan or top view of the same.

Similar letters of reference indicate corresponding parts in the two figures.

This invention consists in having two shoes placed between the wheels of a truck at each side of it, the shoes at each side of the truck being connected substantially as hereinafter shown whereby the action of the wheels, when the shoes are merely brought in contact with them, will move the shoes, one upward and the other down, so that the same will wedge or bind between the wheels and produce the requisite friction to stop the car.

To enable those skilled in the art to fully understand and construct my invention I will proceed to describe it.

A, represents a car-truck which may be constructed in the usual way. B, are its wheels attached permanently to axles C, which extend transversely the whole width of the truck, a pair of wheels being placed on one axle. The above parts are all arranged in the ordinary way, and therefore do not require a minute description.

At each side of the truck A, and between the two wheels, thereat a pendent box D, is attached. These boxes are provided with grooves $a$, in which shoes E, are placed or fitted and allowed to slide freely up and down. The outer edges or faces of the shoes are curved or made of concave form corresponding with the curvature of a circle larger than the wheels as shown clearly in Fig. 1. The inner edges of the shoes have racks $b$, formed on them, and a pinion F, gears into the racks of each pair of shoes as shown clearly in Fig. 1. The pinions F, are within the boxes D, and are placed on the end of a shaft G, which extends underneath the truck and is connected by arms, $c$, $c$, and a link $d$, to a longitudinal shaft H, in the truck. The shafts H, of the trucks of a series of cars, two or more, may be connected by universal joints $f$, constructed and arranged in any proper way.

From the above description it will be seen that when the truck is moving along, and the shoes E, E, by the movement of shaft G, or other device brought in contact with the treads of the wheels B, the wheels will force one shoe upward and the other downward, see Fig. 1, in which the arrows 1, show the direction in which the wheels turn, and the arrows 2, show the direction in which the shoes are moved. This movement of each pair of shoes simultaneously in opposite directions causes them to bind on the wheels and act similarly to a wedge, the result being due to the connection formed between the shoes, racks and a pinion being shown for that purpose but they might be connected by other means.

The brake is virtually self-acting, all that is required being merely to move the shoes in contact with the wheels, the latter then effecting the desired result.

I am aware that shoes have been placed between the wheels of a truck and so connected by levers that they could be pressed simultaneously against the treads of the wheels.

I do not claim therefore simply the employment or use of shoes placed between the wheels at each side of a truck to act upon the treads of the wheels, irrespective of the connecting of the shoes to act as described.

I claim therefore as new and desire to secure by Letters Patent,

Connecting the two shoes E, E, between the wheels B, at each side of a truck, by means of racks $b$, and a pinion F, whereby the shoes when brought in contact with the treads of the wheels, are made by the action of the wheels to move simultaneously in opposite directions and bind or wedge between the wheels to stop the same, substantially as described.

A. P. TUTTON.

Witnesses:
MATTHIAS MONGEL,
SOLOMON S. DICK.